United States Patent
Rozner et al.

(10) Patent No.: US 12,154,378 B2
(45) Date of Patent: *Nov. 26, 2024

(54) TECHNIQUES FOR DETECTING A THREE-DIMENSIONAL FACE IN FACIAL RECOGNITION

(71) Applicant: Tyco Fire & Security GmbH, Neuhausen am Rheinfall (CH)

(72) Inventors: Amit Rozner, Yehud (IL); Lior Kirsch, Ramat-Gan (IL); Tamar Boué, Petah Tikva (IL); Yohay Falik, Petah Tiqwa (IL)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/447,991

(22) Filed: Aug. 10, 2023

(65) Prior Publication Data

US 2023/0386256 A1 Nov. 30, 2023

Related U.S. Application Data

(63) Continuation of application No. 17/839,081, filed on Jun. 13, 2022, now Pat. No. 11,763,601, which is a (Continued)

(51) Int. Cl.
*G06V 40/16* (2022.01)
*G06F 21/32* (2013.01)
(Continued)

(52) U.S. Cl.
CPC ........... *G06V 40/173* (2022.01); *G06F 21/32* (2013.01); *G06T 17/205* (2013.01); *G06V 20/647* (2022.01); *G06T 2200/08* (2013.01)

(58) Field of Classification Search
CPC ........... G06K 9/00295; G06K 9/00208; G06K 9/00899; G06K 9/00255; G06K 9/00288;
(Continued)

(56) References Cited

U.S. PATENT DOCUMENTS

| 9,607,138 | B1 * | 3/2017 | Baldwin | ............... H04W 12/06 |
| 2007/0127787 | A1 * | 6/2007 | Castleman | ........... G06V 40/165 |
| | | | | 382/118 |
| 2019/0164341 | A1 * | 5/2019 | Venkataraman | ..... G06V 40/164 |

FOREIGN PATENT DOCUMENTS

WO 2019102442 A1 5/2019

OTHER PUBLICATIONS

Bewley et al., "Simple Online and Realtime Tracking," 2016 IEEE International Conference on Image Processing (ICIP), 2016, 5 pages.

(Continued)

*Primary Examiner* — Christopher M Brandt
(74) *Attorney, Agent, or Firm* — ArentFox Schiff LLP

(57) ABSTRACT

Examples relate to processing a first image captured by a camera at a first time to determine a first set of multiple key points of a face in the first image, processing a second image captured by the camera at a second time to determine a second set of the multiple key points on the face in the second image, determining a location of at least a portion of the multiple key points in a three-dimensional space based on a first location of each of the portion of the multiple key points in the first image and a second location of each of the portion of the multiple key points in the second image, and detecting whether the face is a valid three-dimensional face for facial recognition based at least in part on the location of at least the portion of the multiple key points in the three-dimensional space.

20 Claims, 6 Drawing Sheets

Related U.S. Application Data continuation of application No. 16/534,435, filed on Aug. 7, 2019, now Pat. No. 11,386,707.

(51) Int. Cl.
*G06T 17/20* (2006.01)
*G06V 20/64* (2022.01)

(58) Field of Classification Search
CPC ... G06K 9/00281; G06F 21/32; G06T 17/205; G06T 2200/08
See application file for complete search history.

(56) References Cited

OTHER PUBLICATIONS

Hartley et al., "Multiple View Geometry in Computer Vision," Cambridge University Press, 2003, pp. 178-193, 673 pages total.
International Search Report and Written Opinion in PCT/US2020/044290, mailed Nov. 9, 2020, 17 pages.
Kuhn, H., "The Hungarian Method for the Assignment Problem," Naval Research Logistics Quarterly, 1995, vol. 2, pp. 83-97.
Umeyama, S., "Least-Squares Estimation of Transformation Parameters Between Two Point Patterns," IEEE Transactions on Pattern Analysis & Machine Intelligence, Apr. 1991, vol. 13, No. 4 pp. 376-380.
Wikipedia, "Triangulation," Wikipedia.org, Feb. 9, 2021, Retrieved from Internet: <https://en.wikipedia.org/w/index.php?title=triangulation&oldid=908958373>, 3 pages.

\* cited by examiner ically pointed out in the claims.
TECHNIQUES FOR DETECTING A THREE-DIMENSIONAL FACE IN FACIAL RECOGNITION

CLAIM OF PRIORITY UNDER 35 U.S.C. § 119

The present Application for Patent is a continuation of patent application Ser. No. 17/839,081, entitled "TECHNIQUES FOR DETECTING A THREE-DIMENSIONAL FACE IN FACIAL RECOGNITION" filed Jun. 13, 2022, which is a continuation of patent application Ser. No. 16/534,435, entitled "TECHNIQUES FOR DETECTING A THREE-DIMENSIONAL FACE IN FACIAL RECOGNITION" filed Aug. 7, 2019, which are assigned to the assignee hereof and hereby expressly incorporated by reference herein for all purposes.

BACKGROUND

Friction-less access control systems provide an easy and hassle-free mechanism for identifying authorized personnel and allowing them access to a restricted region, which may include physical regions of a building, secured physical or virtual resources, such as a safe, a computer, certain network resources via a workstation computer or other accessing device, etc. As such, access control systems, in general, can be coupled with substantially any device that secures a physical or virtual area to provide functionality for identifying a being (e.g., person) desiring access to the area, and the device securing the area can use the identification to determine whether to grant access (and/or a level of access to be granted) to the being. Friction-less access control systems can recognize a being from a video feed by using facial recognition based on comparing images of a face of the being, which are captured by a camera, to known or otherwise stored images of faces of identifiable beings. When the comparison results in a match, an identification may be made with a certain confidence level, and a device may determine to allow access to an area based on the comparison results and/or confidence level. In this regard, friction-less access control systems do not require a specific trigger by the being, but rather can make an identification as the being is walking towards the access control system.

Using such access control systems, however, may possibly permit positive identification of a picture of the face of the being, allowing other beings to gain access to the restricted area simply by displaying a printed picture or screen displayed picture (e.g., on a tablet or mobile device) of an authorized being.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a system for detecting three-dimensional features in validating a face for facial recognition is provided that includes a camera, and at least one processor configured to process a first image captured by the camera at a first time to determine a first set of multiple key points of a face in the first image, process a second image captured by the camera at a second time, that is within a threshold time of the first time, to determine a second set of the multiple key points on the face in the second image, determine, based on a first location of each of a portion of the multiple key points in the first image and a second location of each of the portion of the multiple key points in the second image, a three-dimensional location of at least the portion of the multiple key points in a three-dimensional space, and detect whether the face is a valid three-dimensional face for facial recognition at least in part on the three-dimensional location of at least the portion of the multiple key points.

In another example, a computer-implemented method for detecting three-dimensional features in validating a face for facial recognition is provided. The method includes processing a first image captured by a camera at a first time to determine a first set of multiple key points of a face in the first image, processing a second image captured by the camera at a second time, that is within a threshold time of the first time, to determine a second set of the multiple key points on the face in the second image, determining, based on a first location of each of a portion of the multiple key points in the first image and a second location of each of the portion of the multiple key points in the second image, a three-dimensional location of at least the portion of the multiple key points in a three-dimensional space, and detecting whether the face is a valid three-dimensional face for facial recognition at least in part on the three-dimensional location of at least the portion of the multiple key points.

In another example, a non-transitory computer-readable medium including code executable by one or more processors for detecting three-dimensional features in validating a face for facial recognition is provided. The code includes code for processing a first image captured by a camera at a first time to determine a first set of multiple key points of a face in the first image, processing a second image captured by the camera at a second time, that is within a threshold time of the first time, to determine a second set of the multiple key points on the face in the second image, determining, based on a first location of each of a portion of the multiple key points in the first image and a second location of each of the portion of the multiple key points in the second image, a three-dimensional location of at least the portion of the multiple key points in a three-dimensional space, and detecting whether the face is a valid three-dimensional face for facial recognition at least in part on the three-dimensional location of at least the portion of the multiple key points.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to detecting whether a face that can be identified using facial recognition is a three-dimensional (3D) face. This can prevent positive identification for two-dimensional (2D) representations of the face. In this regard, a friction-less access control system may deny access to a restricted area where the face is not a 3D face, which can prevent fooling the access control system with a printed or screen displayed picture of a face.

In one example, two or more cameras can be positioned at different locations to take different images of a face at a similar point in time. Facial key points can be identified from each image, and triangulation can be used to determine coordinate locations (in 3D space) of each facial key point. The coordinate locations can be compared based on a size (e.g., a threshold distance between points) or based on a classifier to determine whether the coordinate locations are consistent with a 3D face. In one example, an alignment can be applied prior to determining the coordinate locations to simplify the comparison. This can allow for using two (or more) stereo 2D cameras, or other low cost cameras, to determine whether a 3D face is presented for identification, which can be efficient from a cost perspective.

In another example, which can be deployed in a such a camera system or in a system using a single camera, an infrared (IR) pass filter can be used to prevent certain visible light captured by the camera from passing in generating the corresponding image. For example, the IR pass filter can pass IR light. Because electronic displays do not emit infrared light, faces displayed on a screen displayed picture may not pass when generating the corresponding image and/or may be generated as blank or blacked out pixels. In this regard, faces displayed on a screen displayed picture may not be identified and/or may not trigger a corresponding access control system to identify a face. This can also be a low cost mechanism to allow for determining whether a 3D face is presented for identification at least in the case of screen displayed images.

Figure 3:
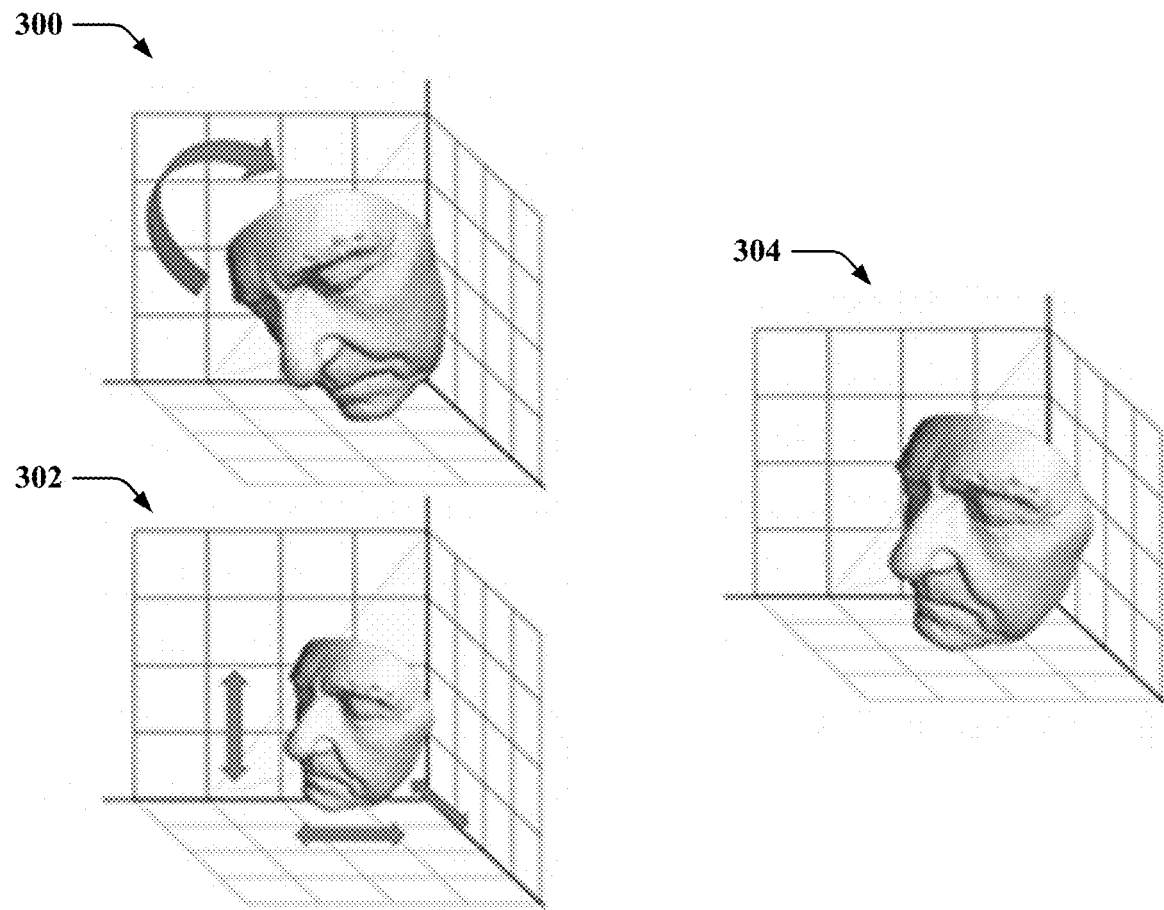
FIG. 3 illustrates an example of applying an alignment to a representation of a 3D face in accordance with examples described herein.
Figure 4:
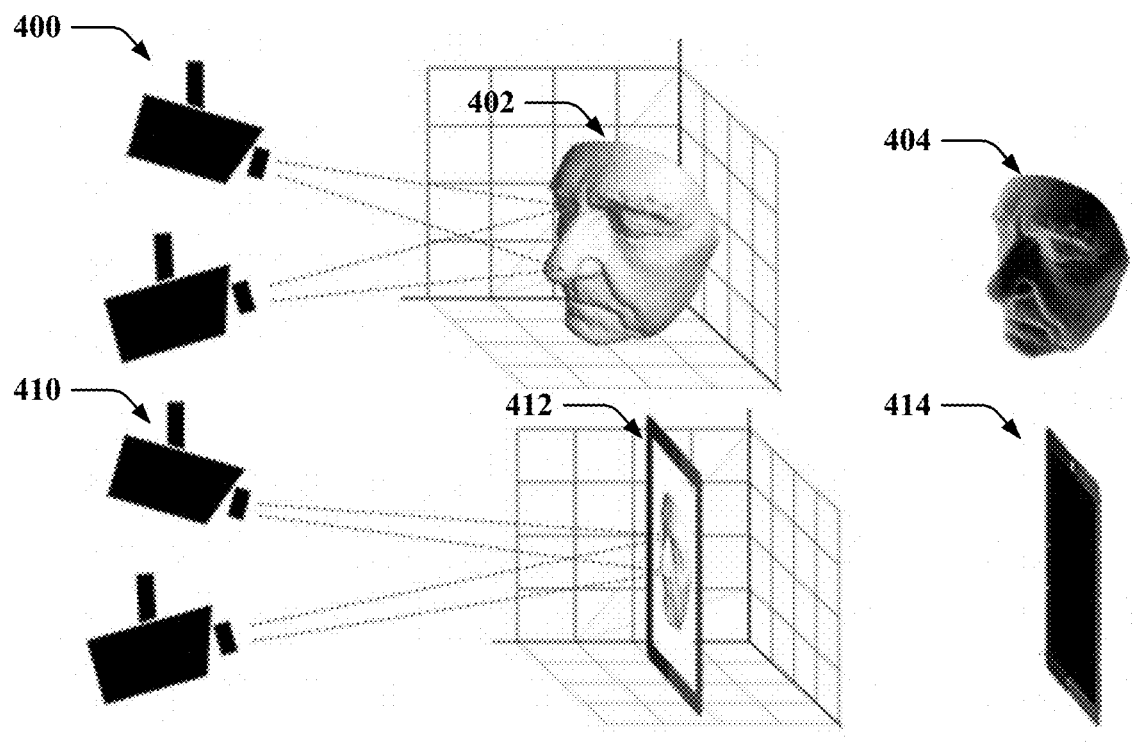
FIG. 4 illustrates an example of faces passing through an infrared pass filter in accordance with examples described herein.
Figure 5:
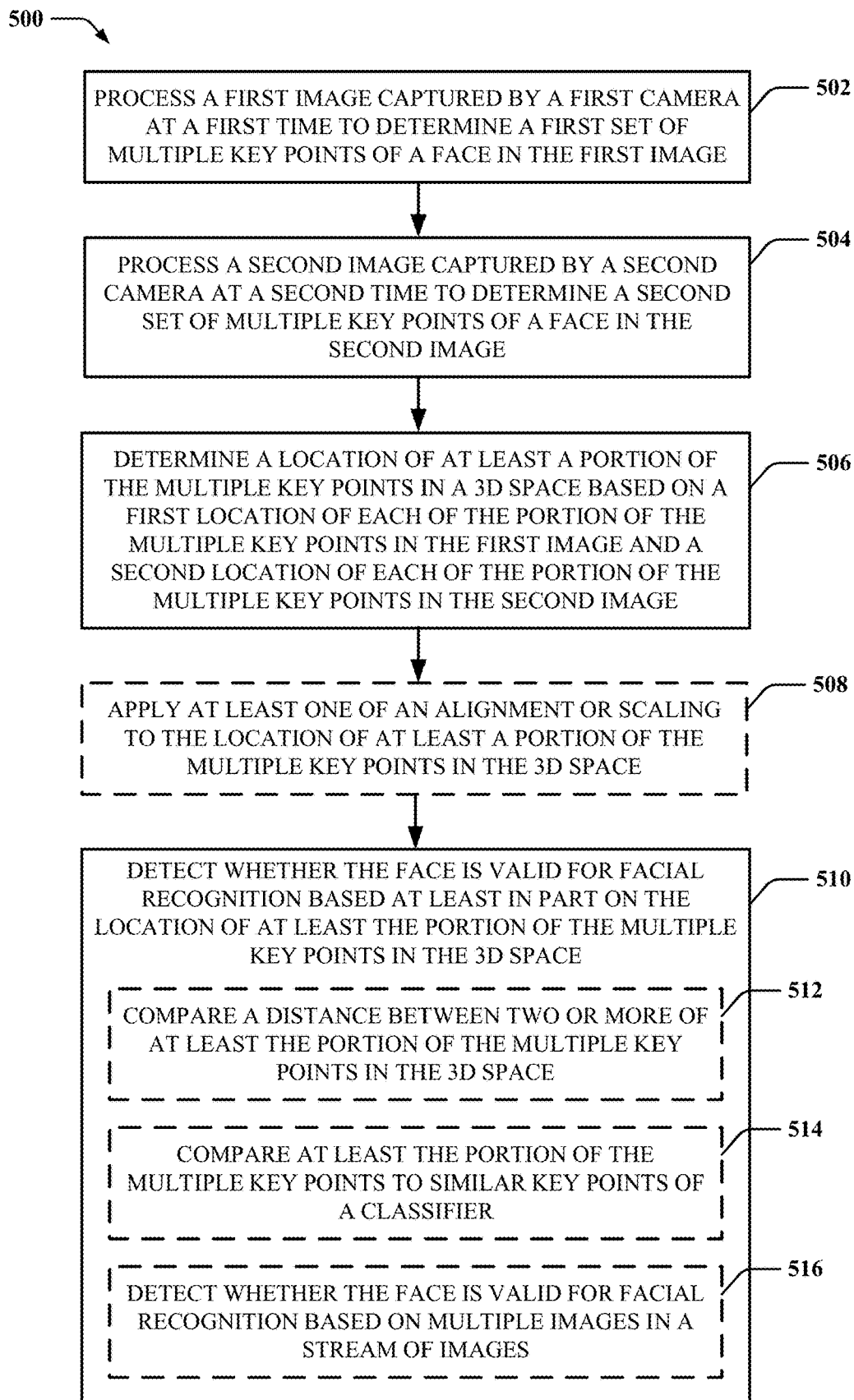
FIG. 5 is a flow diagram of an example of detecting a 3D face in accordance with examples described herein.

Turning now to FIGS. 1-6, examples are depicted with reference to one or more components and one or more methods that may perform the actions or operations described herein, where components and/or actions/operations in dashed line may be optional. Although the operations described below in FIG. 5 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

Figure 1:
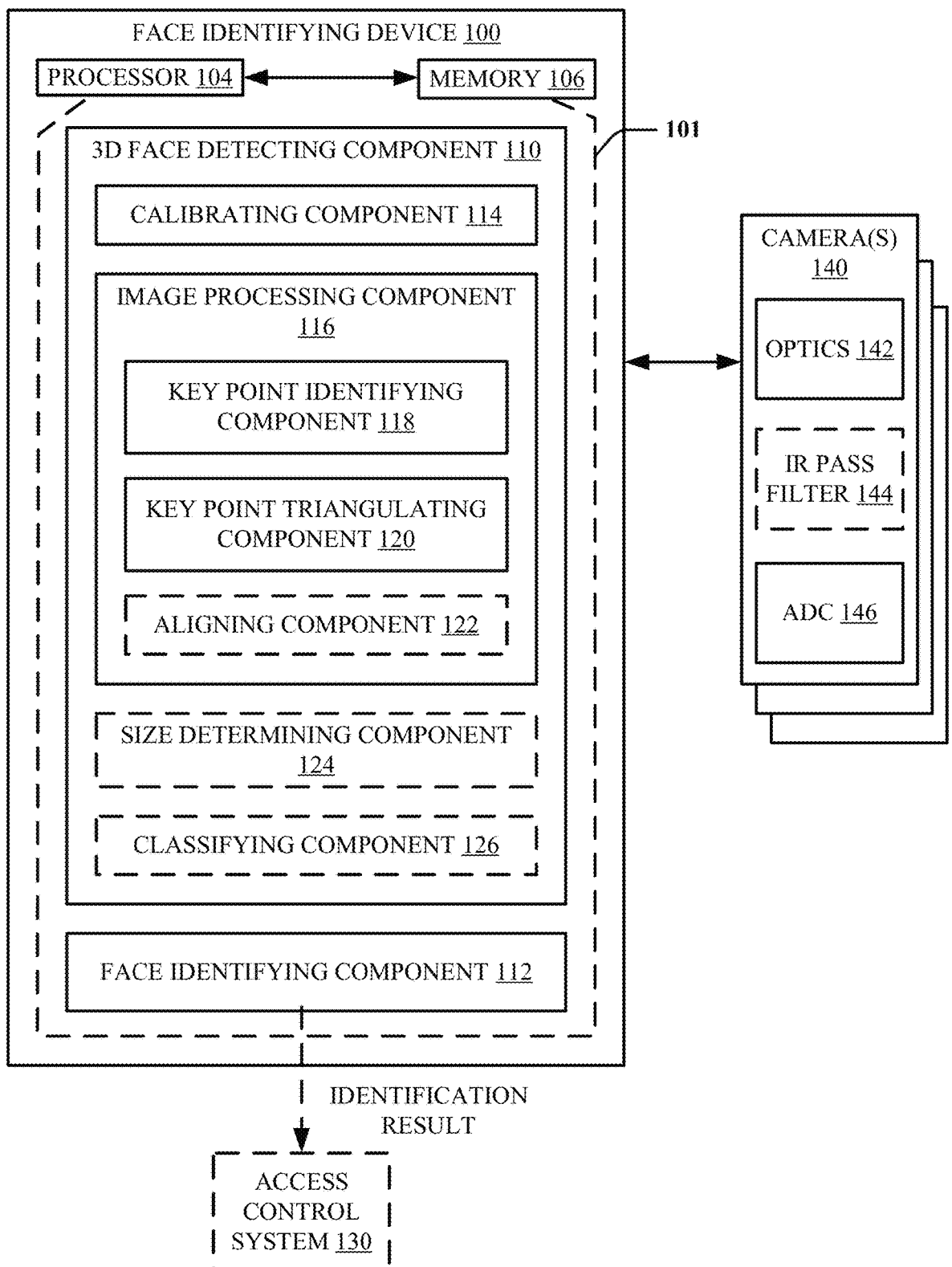
FIG. 1 is a schematic diagram of an example of an access control device capable of identifying a three-dimensional (3D) face in accordance with examples described herein.

FIG. 1 is a schematic diagram of an example of a face identifying device 100 and/or related components for detecting whether a face presented for facial recognition is a 3D face in accordance with aspects described herein. For example, face identifying device 100 can include or can otherwise be coupled with a processor 104 and/or memory 106, where the processor 104 and/or memory 106 can be configured to execute or store instructions or other parameters related to detecting a 3D face in facial recognition, as described herein. For example, processor 104 and memory 106 may be separate components communicatively coupled by a bus (e.g., on a motherboard or other portion of a computing device, on an integrated circuit, such as a system on a chip (SoC), etc.), components integrated within one another (e.g., processor 104 can include the memory 106 as an on-board component 101), and/or the like. Memory 106 may store instructions, parameters, data structures, etc., for use/execution by processor 104 to perform functions described herein.

In an example, face identifying device 100 can include a 3D face detecting component 110 for determining whether a face presented for facial recognition is a 3D face and/or a face identifying component 112 for performing facial recognition to identify a person associated with a face and/or to determine a level of access associated with the person with respect to a restricted area. As described, the face identifying device 100 can be coupled with an access control system 130 to regulate access to a physical or virtual area or resources. In addition, face identifying device 100 may be coupled to, and/or may include, one or more cameras 140 to facilitate facial recognition by obtaining images from the camera(s) 140 that include one or more faces of person(s) in the images. In this regard, face identifying device 100 may produce an identification result based on the image(s), which can be used to determine an identity associated with one or more faces. For example, the identification result can be used to determine, via the access control system 130, a level of access of a person having the identified face with respect to resource(s), to allow or deny, via the access control system 130, access to the resource(s), and/or the like. In an example, though "person" is used in examples described herein, the various examples and associated functionality can be applied for detecting faces of other beings as well.

In one example, 3D face detecting component 110 can be employed before or after face identification to determine whether the face presented for facial recognition is 3D or not. In this example, face identifying device 100 can refrain from outputting identification results of faces that are determined to not be 3D faces, can output a lower confidence level or facial recognition of faces that are determined to not be 3D faces, and/or the like. In another example, where 3D face detecting component 110 determines whether a face presented for recognition is 3D before performing facial identification via face identifying component 112, 3D face detecting component 110 may refrain from providing a presented face for facial identification where it determines the face is not a 3D face.

In an example, 3D face detecting component 110 can include a calibrating component 114 for calibrating multiple cameras 140 to facilitate determining locations of key points in a 3D coordinate space based on positioning of the cameras 140. In another example, 3D face detecting component 110 can include an image processing component 116 for obtaining one or more images and determining key points and/or related locations of the key points in a 3D space. For example, image processing component 116 can optionally include a key point identifying component 118 for identifying key points of a face in multiple received images, a key point triangulating component 120 for determining the key points of the face in 3D space, and/or an optional aligning component 122 for applying a scaling and/or aligning of the key points to facilitate simplified classifying. 3D face detecting component 110 can also include a size determining component 124 for determining one or more size metrics of the face, such as a distance, in the 3D coordinate space, between two or more of the key points, which may be compared to one or more thresholds to determine whether (or at least a confidence level that) the face is a 3D face. 3D face detecting component 110 can also include a classifying component 126 for comparing at least a portion of the key points to key points of a classifier to determine whether (or at least a confidence level that) the face is a 3D face.

Moreover, camera(s) 140 can include optics 142 for capturing analog light signals indicative of an image, an optional IR pass filter 144 for filtering IR light, and/or an analog-to-digital converter (ADC) 146 for converting the analog light signals (e.g., after the IR pass filter 144 or otherwise) to digital data for providing to the face identifying device 100. In one example, camera(s) 140 can be 2D stereo cameras, as described above, to lower cost of manufacturing the system. In another example, camera(s) 140 can be video cameras that capture multiple images over a period of time. In an example, face identifying device 100 can perform facial recognition and/or 3D face determination by processing multiple images over time and analyzing processing results (e.g., averaging the results over the period of time or otherwise selecting a result with a highest confidence level, etc.).

In an example, camera(s) 140 can capture one or more images of a face for performing facial recognition. This can include capturing a video stream of images, capturing an image based on detecting presence of movement, etc. In addition, the image can include other parts of the person, additional people/faces, etc. Camera(s) 140 can provide the one or more images to face identifying device 100 (e.g., over a bus, network, or other communication link connecting the face identifying device 100 and camera(s) 140). In a specific example, camera(s) 140 can include two cameras deployed at different locations and positioned to capture the same face(s) from different perspectives. The two cameras are referred to herein as a "right" camera and a "left" camera, though the respective actual location and/or positioning may be any location/positioning that provides different perspectives of captured images. Image processing component 116 can process the one or more images, which may include key point identifying component 118 identifying one or more key points in the one or more images that are associated with a face. An example of key points is shown in FIG. 2.

Figure 2:
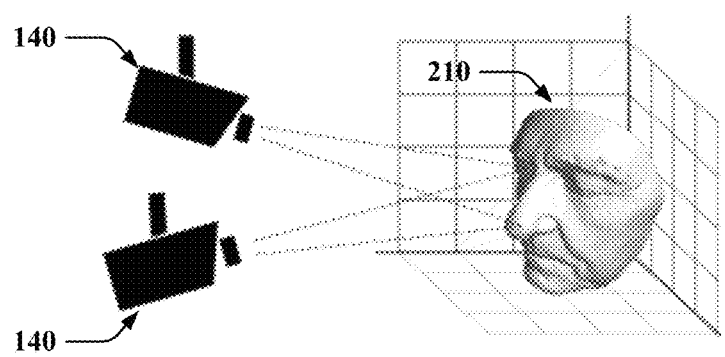
FIG. 2 illustrates an example of multiple key points identified on a face captured by a camera that can be used for classifying the face as a 3D face in accordance with examples described herein.

FIG. 2 illustrates a collection of 68 example key points 200 that can at least partially be identified on faces. In this specific example, the key points can include key points 1-17 indicative of a jaw line of the face, key points 18-27 indicative of eyebrows on the face, key points 28-36 indicative of a nose on the face, key points 37-48 indicative of eyes on the face, and/or key points 49-68 indicative of lips on the face. The key points to be identified can be defined in a 2D coordinate space to facilitate identifying on a 2D image obtained from the camera(s) 140. In one example, the key points to detect can be determined or defined using a deep neural network that detects identifiable key points from a repository of facial images. The deep neural network can be used to detect the key points in a given facial image, which can be performed based on first detecting the face from the image, in one example, and detecting the key points from the face. In one example, facial detection can be separately performed, the detected face can be cropped from the image, and the cropped face can be provided to the deep neural network, which can output the key points. In an example, key point identifying component 118 can receive the key points and can determine whether the key points are in similar locations with respect to similar key points in other facial images in the deep neural network.

In any case, key point identifying component 118 can extract the 2D facial key points from images captured at a similar period of time using both the right and left cameras 140. For example, the similar period of time may include a first time and a second time determined to be the same time and/or within a threshold time of one another (e.g., where the cameras 140 are not precisely synchronized in time). In this example, key point triangulating component 120 can determine locations of the key points in a 3D coordinate space based at least on the location of the extracted 2D facial key points in a 2D coordinate space and known calibration information of the two cameras 140.

For example, calibrating component 114 can provide the calibration information for the cameras 140, which may include pose information determined from intrinsic parameters (e.g., focal length, resolution, etc.) of the cameras 140 and/or extrinsic parameters (e.g., location and/or rotation of one camera relative to the other), and/or the like. In one example, calibrating component 114 can receive this information for providing to the image processing component 116, and/or can determine this information by performing a calibration of the cameras 140. In one example, calibrating component 114 can perform a calibration based on obtaining a target image using both cameras 140, and calibrating based on the obtained target images, known positions of features in the target image, etc. and based on determined intrinsic and/or extrinsic parameters, as described, to determine pose information for each camera 140.

In any case, for a given key point, key point triangulating component 120 can determine location of the key point in a 3D coordinate space by triangulation based at least on the pixel locations of the extracted 2D facial key point in both images and the pose information between the cameras 140. FIG. 2 also illustrates an example of a system 202 for using multiple cameras 140 to capture an image in this regard, and to determine the key points of a face 210 in a 3D coordinate space based on triangulating the 2D pixel locations of the key points in the 2D images captured via cameras 140. Determining the location of key points in the 3D coordinate space in this regard can be more efficient that reconstructing an entire 3D mesh of the face 210. In addition, determining the locations of the key points in the 3D coordinate space can allow for determining whether the face 210 is an actual 3D face as opposed to a 2D representation of the face (e.g., a printed or screen displayed image).

Moreover, key point triangulating component 120 can measure how likely it is that the two 2D key points originated from a single 3D point, which can also be referred to as the triangulation error. The triangulation error may be used to distinguish multiple faces identified in an image. For example, given multiple faces, key point triangulating component 120 can compute a matching score for each pair of faces from the camera 140 images (e.g., pairs from the right and left cameras). The score can be an aggregation of all triangulation errors for all facial key points. Using the scores, key point triangulating component 120 can determine the best match without repetition between the two cameras by solving an optimal assignment problem (also referred to as the Hungarian algorithm). Following that, key point triangulating component 120 can remove 3D faces which are not likely to result from a real 3D object (e.g., 3D faces with low aggregated triangulation score) to determine sets key points associated with a given face.

In any case, for a given set of key points determined to correspond to a face, 3D face detecting component 110 can determine whether the face is a 3D face. In one example, size determining component 124 can determine a size of one or more features of the face based on the locations of at least a subset of the key points in the 3D coordinate space. For example, size determining component 124 can determine a distance between locations of the key points in the 3D coordinate space to determine a size of the face or of certain features of the face, and can determine whether the distance indicates a valid 3D face size and/or corresponding 3D face features. For example, size determining component 124 can compare the distance of two or more key features with typical distances between such features on known faces (e.g., faces from deep neural network training or otherwise) and/or can compare distances between sets of key features in relation to one another to determine whether a relative difference is consistent with typical distances. In the latter example where the relative difference is determined, size determining component 124 can determine whether the face is a 3D face without necessarily scaling the key points, as described further herein. In one example, size determining component 124 can additionally compute a confidence level with respect to determining whether the face is a 3D face, where the confidence level can account for some key point locations that may be outside threshold ranges.

In another example, classifying component 126 can compare the locations of the key points in a 3D coordinate space to a classifier to determine whether the key points are in locations indicative of a 3D face. For example, the classifier can be trained using a deep neural network having associated 3D coordinate space locations of key features of various facial images to determine an acceptable average or range of the key point locations in 3D space. In this example, classifying component 126 can compare the key point locations of the captured images, as described by key point triangulating component 120, to the determined average or range of key point values based on the classifier to determine whether the face is a 3D face. In one example, classifying component 126 can additionally compute a confidence level with respect to determining whether the face is a 3D face, where the confidence level can account for some key point locations that may be outside averages or ranges determined based on the classifier.

In another example, aligning component 122 can perform a scaling or alignment on the key point locations in the 3D coordinate space prior to determining whether the key point locations are indicative of a 3D face (whether via size determination, classification, or other process). For example, aligning the 3D face to a common framework can reduce the variance between real 3D faces captured using the cameras 140. This can increase the robustness of the classifier and/or can significantly decrease the number of samples needed to train a successful or desirable classifier. To align the face, aligning component 122 can use a rigid body transformation where the 3D face can be rotated and/or scaled. For example, aligning component 122 can find a best rotation for the face in the 3D coordinate space, such that the captured 3D face can fit closely to a determined average 3D face, which can be determined as an average of 3D faces used in training the classifier. In one example, aligning component 122 can use the scale in this process as a first level detector to find fraudulent (e.g., non-3D) faces, such as an image of a face presented on a display, such as a mobile device display, or a printed image.

To align the face, in an example, aligning component 122 can solve an optimization problem to find a resulting transformation. For example, the optimization problem may correspond to a formula, such as:

$$\min_{a,R} \| a \cdot R \cdot A_{new} - A_{registered} \|$$

where R is a rotation matrix (e.g., a 3×3 rotation matrix), a is a positive scalar, $A_{registered}$ is a baseline model of a face (e.g., from the trained classifier), and A new is the face defined by the locations of the key points in the 3D coordinate space. In other words, aligning component 122 can determine the values of a and R that minimize the distance between the face defined by the locations of the key points in the 3D coordinate space and the baseline model of the face. Aligning component 122 can then apply these values to the face defined by the locations of the key points in the 3D coordinate space to align and scale the face. Once aligned and/or scaled, this may simplify determining at least one of whether the face is of a size or proportion determined to be indicative of an actual 3D face (e.g., as indicated and/or determined by size determining component 124, as described above), and/or whether the key point locations of the face in the 3D coordinate space are consistent with the classifier.

An example is shown in FIG. 3, which illustrates a 3D face 300 defined by the triangulated key point locations, as described. The 3D face 300 can be rotated based on the determined rotation matrix R to yield rotated face 302, and then can also be scaled based on scalar a, to yield rotated and scaled face 304. The rotated and scaled face 304 can be used to determine whether the face 304 is a 3D face by performing size determination and/or classification, as described herein.

In another example, as described, camera(s) 140 can include video cameras that can capture multiple images over a period of time. In an example, 3D face detecting component 110 can determine whether a face is a 3D face by aggregating multiple decisions over the period of time by processing images in sequential frames. For example, when a new image frame is processed, image processing component 116 can match the current face with the closest track in the image. In other words, image processing component 116 may determine whether a face in the image has a distance from the current face that is less than a threshold. If so, 3D face detecting component 110 can aggregate detection metrics of the faces over multiple frames (e.g., over a threshold number of frames, until the face achieves or exceeds a threshold size, etc.). 3D face detecting component 110 can use the confidence level from each 3D face to determine a probability that the face is a 3D face. The probabilities can then be aggregated for each 3D face to provide a robust confidence level for the multiple frames.

In any case, image processing component 116 can output whether the face is determined to be a 3D face to the face identifying component 112, and if so, face identifying component 112 can perform facial recognition of the face based on one or more of the images captured by the camera(s) 140 and a repository of faces and corresponding identities. In this example, face identifying component 112 may accordingly provide an identification result to an access control system 130 to accordingly control access to a restricted area. In one example, the face identifying component 112 can determine and communicate a confidence level in the identification. In one example, face identifying component 112 can consider a confidence level of the face being a 3D face, as received from 3D face detecting component 110, in determining whether to perform face identification in the first place and/or in determining a separate confidence level for the face identification. For example, 3D face detecting component 110 can apply the confidence level of the face being a 3D face to the confidence level determined for the face identification. In another example, access control system 130 can use the confidence level of the face identification and/or the confidence level of the face being a 3D face in determining whether to grant access to a restricted area and/or a level of access to be granted. In another example, if image processing component 116 determines the face is not a 3D face, it may indicate such to the face identifying component 112 or can otherwise refrain from passing the image (or any information resulting from obtaining the image(s) of the face) to the face identifying component 112 altogether.

In another example, one or more cameras 140 may include an IR pass filter 144 to pass only IR light from the optics 142 for generating the digital image via ADC 146. This can prevent the camera 140 from providing light emitting diode (LED) light or other light that is not in the IR frequency range to the ADC 146 for generating the digital image, which can effectively prevent face identifying device 100 from processing an image that is captured from a screen display, such as a mobile device display.

An example is shown in FIG. 4, which illustrates an example of a two camera system 400 that captures, using each camera, images of a face 402, which can be converted to digital image 404 for performing 3D face detection, as described above. The cameras can include an IR pass filter, such that IR light can pass, and allow for generating digital image 404 of the face 402. FIG. 4 also illustrates two camera system 410 that captures, using each camera, images of a device 412 displaying a face. The cameras can include an IR pass filter, such that only IR light can pass, and allow for generating digital image 414 of the device 412 but with no light from the screen portion. In this regard, a face identifying device 100 does not identify the face on the screen, as the digital image from the camera(s) show no light on the screen portion of the picture of the device 412.

FIG. 5 is a flowchart of an example of a method 500 for detecting whether a face captured by one or more cameras is a 3D face. For example, method 500 can be performed by the face identifying device 100, and is accordingly described with reference to FIG. 1, as a non-limiting example of an environment for carrying out method 500.

In method 500, at action 502, a first image captured by a first camera at a first time can be processed to determine a first set of multiple key points of a face in the first image. In an example, key point identifying component 118, e.g., in conjunction with processor 104, memory 106, image processing component 116, etc., can process the first image captured by the first camera 140 at the first time to determine the first set of multiple key points of the face in the first image. In an example, image processing component 116 can receive the first image and can attempt to detect a set of key points that can be used to identify a face in the first image, as described above.

In method 500, at action 504, a second image captured by a second camera at a second time can be processed to determine a second set of multiple key points of a face in the second image. In an example, key point identifying component 118, e.g., in conjunction with processor 104, memory 106, image processing component 116, etc., can process the second image captured by the second camera 140 at the second time to determine the second set of multiple key points of the face in the second image. For example, the second time may be a time that is the same as or within a threshold time of the first time, as described above, such that the images are temporally-related an include a similar face taken from different perspectives corresponding to the respective locations of the first camera and the second camera. In an example, image processing component 116 can receive the second image and can attempt to detect a set of key points that can be used to identify the face in the second image as well, as described above.

In method 500, at action 506, a location of at least a portion of the multiple key points in a 3D space can be determined based on a first position of each of the portion of the multiple key points in the first image and a second position of each of the portion of the multiple key points in the second image. In an example, key point triangulating component 120, e.g., in conjunction with processor 104, memory 106, image processing component 116, etc., can determine the location of at least the portion of the multiple key points in the 3D space based on the first location of each of the portion of the multiple key points in the first image and the second location of each of the portion of the multiple key points in the second image. In addition, for example, key point triangulating component 120 can determine the location of the multiple key points in the 3D space using triangulation based on the 2D pixel locations of the key points in the first and second images, and pose information of the corresponding cameras 140, as described above. Moreover, additional cameras (and corresponding additional images of the face from additional perspectives) may be used in some examples to provide additional key points for triangulation.

In method 500, optionally at action 508, at least one of an alignment or scaling can be applied to the location of at least a portion of the multiple key points in the 3D space. In an example, aligning component 122, e.g., in conjunction with processor 104, memory 106, image processing component 116, etc., can apply at least one of the alignment or scaling to the location of at least the portion of the multiple key points in the 3D space. In an example, this can allow for simplified 3D face detection based on the classifier where the images in the classifier are similarly aligned, and/or can allow for simplified 3D face detection based on size determination using thresholds set for faces at a certain size. As described, in an example, calibrating component 114 can determine the pose (e.g., perspective) information of the cameras 140 during a calibration procedure using a target image or can otherwise receive the information from one or more other sources.

In method 500, at action 510, it can be detected whether the face is valid for facial recognition based at least in part on the location of at least the portion of the multiple key points in the 3D space. In an example, 3D face detecting component 110, e.g., in conjunction with processor 104, memory 106, image processing component 116, etc., can detect whether the face is valid for facial recognition based at least in part on the location of at least the portion of the multiple key points in the 3D space.

In one example, in detecting whether the face is valid at action 510, optionally at action 512, a distance between two or more of at least the portion of the multiple key points in the 3D space can be compared. In an example, size determining component 124, e.g., in conjunction with processor 104, memory 106, 3D face detecting component 110, etc., can compare the distance between locations of the two or more of at least the portion of the multiple key points in the 3D space. For example, as described, where various ones of the key points are outside of a threshold range determined to be indicative of a face (e.g., via deep neural network training or other specification of the threshold range), size determining component 124 may determine that the size and/or distance between key points is not consistent with a 3D face. In another example, error in the key point distance can be used to compute a confidence level for a determination that the images include a 3D face.

In another example, in detecting whether the face is valid at action 510, optionally at action 514, at least the portion of the multiple key points can be compared to similar key points of a classifier. In an example, classifying component 126, e.g., in conjunction with processor 104, memory 106, 3D face detecting component 110, etc., can compare locations of the at least the portion of the multiple key points to the locations of similar key points of the classifier. For example, as described, where the portion of the multiple key points are matched (e.g., within a threshold) to the classifier, classifying component 126 can determine that the images include a 3D face. In another example, the extent to which the multiple key points are matched (or not matched) in the classifier can be used to compute a confidence level for a determination that the images include a 3D face.

In another example, in detecting whether the face is valid at action 510, optionally at action 516, it can be detected with the face is valid for facial recognition based on multiple images in a stream of images. In an example, 3D face detecting component 110, e.g., in conjunction with processor 104, memory 106, etc., can detect whether the face is valid for facial recognition based on multiple images in a stream of images. As described, the cameras 140 can include video cameras that capture the stream of images, and 3D face detecting component 110 can perform the described 3D face detection over multiple sequential images, and can aggregate confidence levels or other metrics for each of the multiple sequential images to determine a probability or decision that the face in the stream of images is a valid 3D face for facial recognition.

In an example, the determination of whether the face is a valid 3D face and/or the corresponding confidence level can be used in subsequent face identification, as described herein, to determine whether to perform the face identification and/or to compute a confidence level for the face identification.

Figure 6:
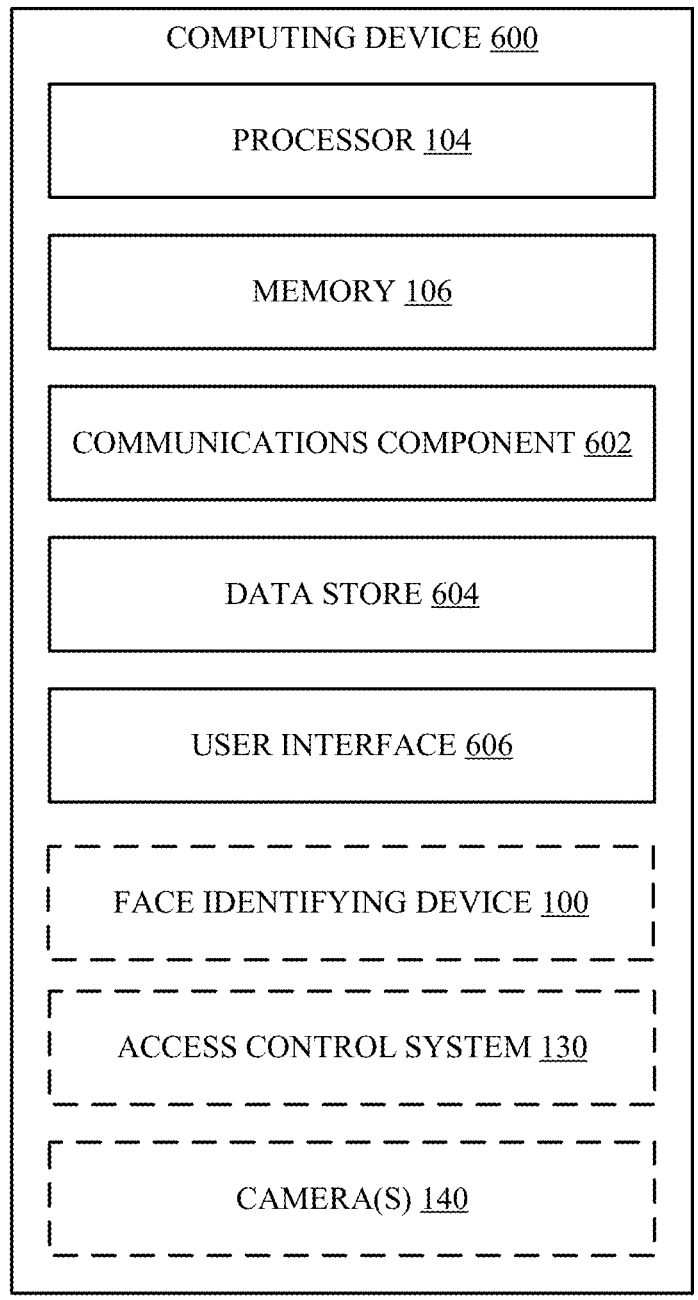
FIG. 6 is a schematic diagram of an example of a computing device for performing functions described herein.

FIG. 6 illustrates an example of computing device 600 including additional optional component details as those shown in FIG. 1. In one example, computing device 600 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 600 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, such as face identifying device 100, access control system 130, camera(s) 140, and/or components thereof, etc., as described herein, and/or other components of the computing device 600.

Further, computing device 600 may include a communications component 602 that provides for establishing and maintaining communications with one or more other devices, parties, entities, etc. utilizing hardware, software, and services as described herein. Communications component 602 may carry communications between components on computing device 600, as well as between computing device 600 and external devices, such as devices located across a communications network and/or devices serially or locally connected to computing device 600. For example, communications component 602 may include one or more buses, and may further include transmit chain components and receive chain components associated with a wireless or wired transmitter and receiver, respectively, operable for interfacing with external devices. For example, communications component 602 can carry communications between face identifying device 100, access control system 130, camera(s) 140, etc., one or more of which may be executing on another device (or the same device), etc.

Additionally, computing device 600 may include a data store 604, which can be any suitable combination of hardware and/or software, that provides for mass storage of information, databases, and programs employed in connection with examples described herein. For example, data store 604 may be or may include a data repository for applications and/or related parameters not currently being executed by processor 104. In addition, data store 604 may be a data repository for face identifying device 100, access control system 130, camera(s) 140, and/or components thereof, etc. executing on the processor 104, and/or one or more other components of the computing device 600.

Computing device 600 may also include a user interface component 606 operable to receive inputs from a user of computing device 600 and further operable to generate outputs for presentation to the user. User interface component 606 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 606 may include one or more output devices, including but not limited to a speaker, a haptic feedback mechanism, a printer, any other mechanism capable of presenting an output to a user, or any combination thereof.

Computing device 600 can also include one or more of a face identifying device 100 for identifying a face based on detecting whether the face is a valid 3D face, as described above, one or more cameras 140 to capture images of the face used to generate a representation of the face in a 3D coordinate space, and/or an access control system 130 for receiving a face identification from the face identifying device 100 and accordingly controlling access to a restricted area based on an identity determined for the face, as described above.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A system for detecting three-dimensional features in validating a face for facial recognition, comprising:
a camera; and
at least one processor configured to:
process a first image captured by the camera at a first time to determine a first set of multiple key points of a face in the first image;
process a second image captured by the camera at a second time, that is within a threshold time of the first time, to determine a second set of the multiple key points on the face in the second image;
determine, based on a first location of each of a portion of the multiple key points in the first image and a second location of each of the portion of the multiple key points in the second image, a three-dimensional location of at least the portion of the multiple key points in a three-dimensional space; and
detect whether the face is a valid three-dimensional face for facial recognition at least in part on the three-dimensional location of at least the portion of the multiple key points.

2. The system of claim 1, wherein the at least one processor is configured to detect whether the face is the valid three-dimensional face based on using a classifier on the three-dimensional locations.

3. The system of claim 1, wherein the at least one processor is configured to detect whether the face is the valid three-dimensional face based on comparing the three-dimensional location of at least the portion of the multiple key points to similar key points of a known face to determine a difference.

4. The system of claim 3, wherein the at least one processor is configured to detect whether the face is the valid three-dimensional face based on providing the difference to a classifier that indicates, based on the difference, whether the face is the valid three-dimensional face.

5. The system of claim 3, wherein the at least one processor is further configured to apply, before comparing at least the portion of the multiple key points to similar key points of the known face, at least one of an alignment or a scaling to the three-dimensional location of at least the portion of the multiple key points in the three-dimensional space.

6. The system of claim 1, further comprising an infrared pass filter for applying to at least one of the first image or the second image to filter infrared light for detecting whether the face is the valid three-dimensional face for facial recognition.

7. The system of claim 1, wherein the camera is a video camera configured to capture the first image and the second image in a stream of images in a video.

8. The system of claim 1, wherein the second image is captured by the camera based on detecting movement after capturing the first image.

9. The system of claim 1, wherein the at least one processor is further configured to perform facial recognition based on detecting that the face is the valid three-dimensional face for facial recognition.

10. The system of claim 1, wherein the at least one processor is configured to detect whether the face is the valid three-dimensional face for facial recognition at least in part by determining a confidence level associated with the detecting.

11. The system of claim 10, wherein the at least one processor is further configured to provide the confidence level to an access control system for restricting, based at least in part on the confidence level, access to an area.

12. A computer-implemented method for detecting three-dimensional features in validating a face for facial recognition, comprising:
- processing a first image captured by a camera at a first time to determine a first set of multiple key points of a face in the first image;
- processing a second image captured by the camera at a second time, that is within a threshold time of the first time, to determine a second set of the multiple key points on the face in the second image;
- determining, based on a first location of each of a portion of the multiple key points in the first image and a second location of each of the portion of the multiple key points in the second image, a three-dimensional location of at least the portion of the multiple key points in a three-dimensional space; and
- detecting whether the face is a valid three-dimensional face for facial recognition at least in part on the three-dimensional location of at least the portion of the multiple key points.

13. The computer-implemented method of claim 12, wherein detecting whether the face is the valid three-dimensional face is based on using a classifier on the three-dimensional locations.

14. The computer-implemented method of claim 12, wherein detecting whether the face is the valid three-dimensional face is based on comparing the three-dimensional location of at least the portion of the multiple key points to similar key points of a known face to determine a difference.

15. The computer-implemented method of claim 14, wherein detecting whether the face is the valid three-dimensional face is based on providing the difference to a classifier that indicates, based on the difference, whether the face is the valid three-dimensional face.

16. The computer-implemented method of claim 14, further comprising applying, before comparing at least the portion of the multiple key points to similar key points of the known face, at least one of an alignment or a scaling to the three-dimensional location of at least the portion of the multiple key points in the three-dimensional space.

17. The computer-implemented method of claim 12, further comprising applying, to at least one of the first image or the second image, an infrared pass filter to filter infrared light for detecting whether the face is the valid three-dimensional face for facial recognition.

18. A non-transitory computer-readable medium, comprising code executable by one or more processors for detecting three-dimensional features in validating a face for facial recognition, the code comprising code for:
- processing a first image captured by a camera at a first time to determine a first set of multiple key points of a face in the first image;
- processing a second image captured by the camera at a second time, that is within a threshold time of the first time, to determine a second set of the multiple key points on the face in the second image;
- determining, based on a first location of each of a portion of the multiple key points in the first image and a second location of each of the portion of the multiple key points in the second image, a three-dimensional location of at least the portion of the multiple key points in a three-dimensional space; and
- detecting whether the face is a valid three-dimensional face for facial recognition at least in part on the three-dimensional location of at least the portion of the multiple key points.

19. The non-transitory computer-readable medium of claim 18, wherein the code for detecting detects whether the face is the valid three-dimensional face based on using a classifier on the three-dimensional locations.

20. The non-transitory computer-readable medium of claim 18, wherein the code for detecting detects whether the face is the valid three-dimensional face based on comparing the three-dimensional location of at least the portion of the multiple key points to similar key points of a known face to determine a difference.

\* \* \* \* \*